United States Patent
Casey et al.

(10) Patent No.: US 7,054,417 B2
(45) Date of Patent: May 30, 2006

(54) ADVANCED CALL SCREENING APPLIANCE

(75) Inventors: Steven M. Casey, Littleton, CO (US); Bruce A. Phillips, Erie, CO (US)

(73) Assignee: Qwest Communications International Inc., Denver, CO (US)

( * ) Notice: Subject to any disclaimer, the term of this patent is extended or adjusted under 35 U.S.C. 154(b) by 269 days.

(21) Appl. No.: 10/644,667

(22) Filed: Aug. 19, 2003

(65) Prior Publication Data

US 2005/0041787 A1    Feb. 24, 2005

(51) Int. Cl.
 *H04M 1/64* (2006.01)
(52) U.S. Cl. .............................. 379/88.17; 379/88.16; 379/373.04
(58) Field of Classification Search .............. 379/67.1, 379/68, 88.13, 88.17, 88.19, 90.01, 93.02, 379/93.03, 201.01, 201.02, 211.01, 211.02, 379/212.01, 373.01, 373.04
See application file for complete search history.

(56) References Cited

U.S. PATENT DOCUMENTS

| | | | |
|---|---|---|---|
| 5,202,765 A | 4/1993 | Lineberry | 348/318 |
| 5,740,075 A | 4/1998 | Bigham et al. | 709/229 |
| 5,784,683 A | 7/1998 | Sistanizadeh et al. | 725/73 |
| 5,923,379 A | 7/1999 | Patterson | 725/70 |
| 5,971,921 A | 10/1999 | Timbel | 600/300 |
| 5,978,451 A * | 11/1999 | Swan et al. | 379/88.24 |
| 5,983,068 A | 11/1999 | Tomich et al. | 725/32 |
| 5,999,599 A * | 12/1999 | Shaffer et al. | 379/93.23 |
| 6,209,025 B1 | 3/2001 | Bellamy | 709/217 |
| 6,282,189 B1 | 8/2001 | Eames | 370/352 |
| 2003/0026416 A1 | 2/2003 | Fusco | 379/374.02 |
| 2003/0027565 A1 * | 2/2003 | Bossemeyer et al. | 455/422 |
| 2003/0152207 A1 * | 8/2003 | Ryan | 379/201.04 |

OTHER PUBLICATIONS

Frank, Edward and Holloway, Jack; "Connecting the Home with a Phone Line Network Chip Set", IEEE Micro, Mar.-Apr. 2000, pp. 2-14.

* cited by examiner

*Primary Examiner*—Ovidio Escalante
(74) *Attorney, Agent, or Firm*—Townsend and Townsend and Crew LLP

(57) ABSTRACT

According to the invention, a network interface device for processing a telephone call is disclosed. The network interface device includes a first and second communication interfaces, a telephone switch and a controller. The first communication interface is coupled to at least one of a wireless phone network, a public switched telephone network (PSTN), and a voice over Internet protocol (VOIP) network. The first communication interface receives the telephone call from any of a number of callers that are remote to the network interface device. The second communication interface coupled to one or more phones at a user location where the one or more phones are associated with a telephone number that any of the callers can use to call the one or more phones. The telephone switch is coupled to both of the first communication interface and second communication interface and optionally routes an incoming phone call to the second communication interface if one or more access control rules permit routing the incoming phone call to the second communication interface. The controller analyzes the one or more access control rules and either routes the incoming phone call from the first communication interface to the second communication interface or prevents the incoming phone call from reaching the second communication interface. The one or more phones ring when the incoming call is routed to the second communication interface.

21 Claims, 10 Drawing Sheets

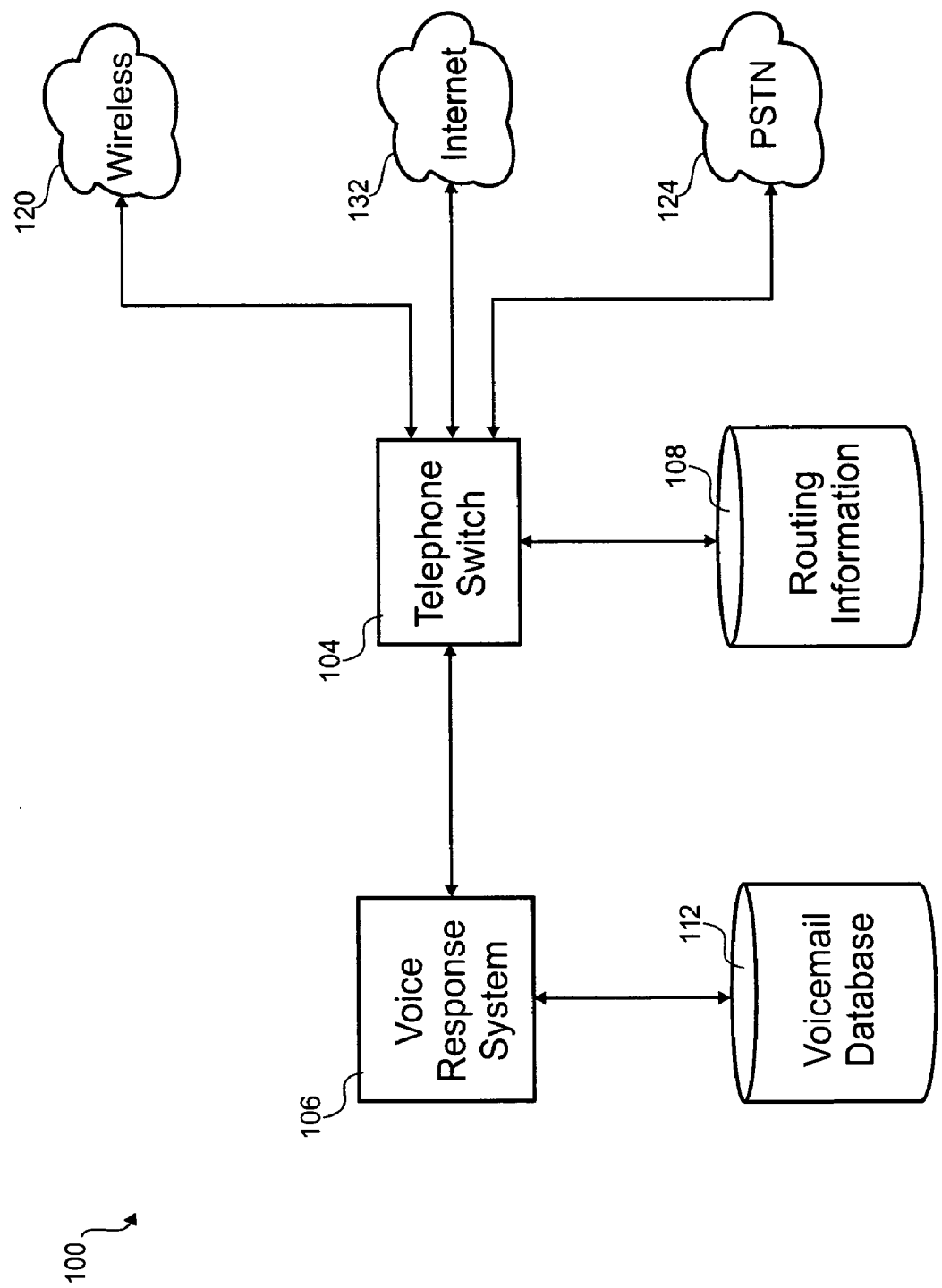

ADVANCED CALL SCREENING APPLIANCE

This application incorporates by reference in their entirety U.S. patent application Ser. No. 10/367,597, filed on Feb. 14, 2003, entitled "SYSTEMS AND METHODS FOR PROVIDING APPLICATION SERVICES;" and U.S. patent application Ser. No. 10/356,364, filed on Jan. 31, 2003, entitled "PACKET NETWORK INTERFACE DEVICE AND SYSTEMS AND METHODS FOR ITS USE."

BACKGROUND OF THE INVENTION

This invention relates in general to telephone systems and, more specifically, to screening of incoming phone calls.

Home phones typically connect directly to the public switched telephone network (PSTN) system. These home phones may display caller ID information or have voice prompt systems. Some of these voice prompt systems have individual mailboxes and other screening capabilities. Business systems have similar capabilities, which are typically hosted in a private branch exchange (PBX).

Many residences already have phone to interface with the PSTN system, but would like advanced calling features. In some cases, these advanced calling features are added to the central offices and other phone system locations. Remotely locating these features makes customization by the user difficult.

BRIEF DESCRIPTION OF THE DRAWINGS

The present invention is described in conjunction with the appended figures:

FIG. 1 is a block diagram of an embodiment of a voice switching system;

Figure 2A:
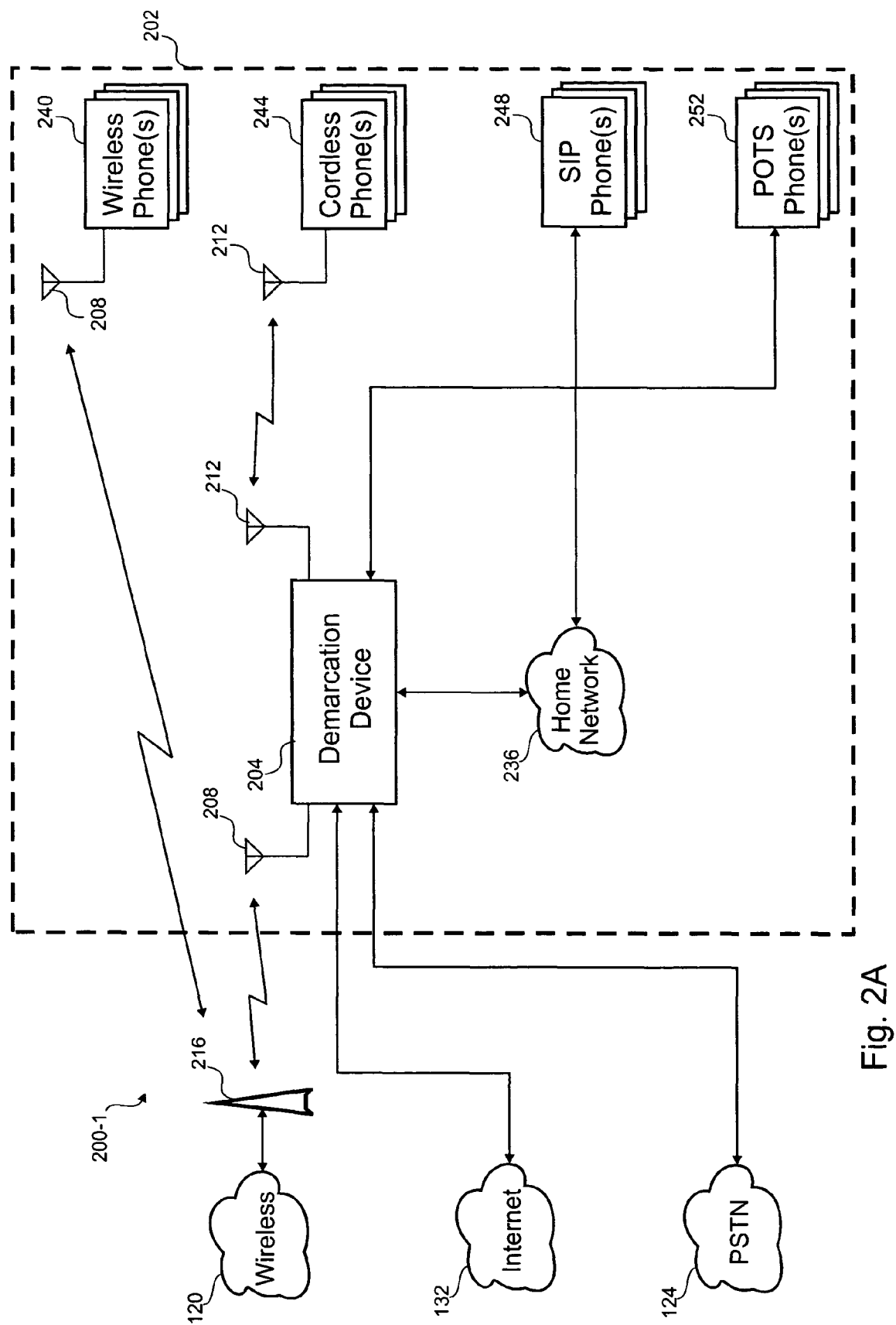
FIG. 2A is a block diagram of an embodiment of a telephone system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Referring first to FIG. 1, a block diagram of an embodiment of a voice switching system 100 is shown. In this embodiment, the telephone switch 104 can bridge voice traffic among a wireless transport network 120, an Internet transport network 132 and a PSTN transport network 124. Calls originate and terminate with one of these networks 120, 124, 132. Other embodiments could have more or less networks 120, 124, 132 available to the telephone switch 104.

The telephone switch 104 relays calls between the various networks 120, 124, 132 that terminate and/or originate phone calls. Signaling and/or header information associated with the voice data informs the telephone switch 104 where to route the call. For example, the telephone switch 104 could receive a call from the PSTN telephone network 124 with a phone number that provisionally sends the call to both the Internet transport network 132 and the wireless transport network 120.

To redirect phone calls, the telephone switch 104 checks a routing information database 108. The terminating end of the phone call could use one or more of the networks 120, 124, 132 or two datapaths in the same network 120, 124, 132. For example the telephone switch 104 could receive a call for a particular number. A check of the routing information database 108 indicates that the call should be sent to a wireless phone that uses the wireless network 120 for connectivity to a user's location.

The routing information database 108 can be updated periodically by the user manually changing routing or by automatic detection of phone connectivity. For example, the user may initially use the wireless network 120 for connectivity to the user location, but could later switch to the Internet 132 for connectivity. In some embodiments, there could be two parallel networks 120, 124, 132 active at one time. The telephone switch 104 could choose one or the other network 120, 124, 132 based upon QoS, availability or other factors.

The various networks 120, 124, 132 could include any number of distinct or partially distinct networks. In this way, there could be many networks. The wireless network 120 could use WIFI,™ microwave, satellite, ultra-wide band (UWB), laser data transport, cellular phone (e.g., CDMA, GSM, TDMA, AMPS, etc.), cellular wireless data, and/or other wireless networks. The Internet network 132 could use optical fiber, coaxial cable mode, DSL, power line data, ethernet, and/or other packet switched networks. Voice over Internet protocol (VOIP) or circuit switched methodologies could be used on the various networks 120, 124, 132. Some networks could be hybrids of other networks. For example, a phone call may originate with a PSTN network 124, but be converted into a VOIP transport using the Internet 132 before reaching the telephone switch 104. Some embodiments could allow routing phone calls over a satellite phone network in addition or in combination with these other networks 120, 124, 132.

If no terminal device answers a phone call, a voice response system 116 could capture a message or simply provide a voice message or interactive series of prompts. This service is optional and could be implemented in the user location for some embodiments. Some embodiments could use call screening rules at the user location that forward some phone calls to the voice response system 116 for handling. The voice response system 116 is accessible to any phone call from any of the networks 120, 124, 132 and could be accessible through a web or application interface on a computer. Messages and voice prompts are stored in a voice mail database 112.

With reference to FIG. 2A, a block diagram of an embodiment of a telephone system 200-1 is shown. In this embodiment, any of the various networks 120, 124, 132 can interface with the user equipment 202. The wireless transport network 120 uses an antenna 216, the Internet transport network 132 uses any of the Internet access media and the PSTN transport network 124 uses circuit switched media to communicate with the user equipment 102. The user equipment could be tied to the user location or could rely upon wireless or cordless technology. This embodiment shows connectivity with all three network categories 120, 124, 132, but a typical user would only choose a subset of the possibilities. For example, the user may have a POTS phone(s) 252 and a wireless phone 240.

The user equipment 202 in this embodiment could include a wireless phone(s) 240 or other phones interfaced to a demarcation device 204. The wireless phone 240 communicates with the wireless network 120 using an antenna 208, but a cordless phone(s) 244, a SIP phone 248 and a POTS phone 252 channel their communication through the demarcation device 204 before coupling to any network 120, 124, 132.

The cordless phone 244 uses an antenna 212 to communicate with a base station in the demarcation device 204. Typically, the range of cordless phones 244 is limited to a few hundred feet and uses unlicensed RF spectra (e.g., 2.4 GHz, 5 GHz, 900 MHz, etc.) in the United States. Some embodiments could have multiple cordless phones 244 using the same RF frequencies or different ones. The demarcation device 204 could support the various frequencies or selectively support them by having a modular design or allowing various frequencies to be activated as cordless phones 244 are added to the telephone system 200-1.

SIP phones 248 use VOIP technology to allow communicating conversations over a packet switched home network 236. Typically, the SIP phone 248 has a network port such as ethernet, HPNA, power-line data, cable modem, UWB, WIFI,™ or DSL to support communication over the home network 236. There could be various routers, bridges and/or switches within the home network 236 to support the SIP phones 248. Where there are multiple SIP phones in a user location, each could be active at the same time so long as the networks 120, 124, 132 could support the simultaneous connections. The home network 236 could also be used by computers. In one embodiment, the routing characteristics and any configuration for the demarcation device is accessed through an application and/or web interface using the home network 236. This interface could be securely accessible from the Internet network 132 also in some embodiments.

POTS phones 252 are traditional phones that natively operate with a PSTN network 124. The demarcation device 204 supports these ubiquitous phones. The POTS phones 252 could be cordless in some embodiments as is well known in the art. Some user locations could have multiple POTS phones 252 on the same phone line or spread among a number of lines.

The demarcation device 204 is interposed between some of the phone types 244, 248, 252 and the various transport networks 120, 124, 132. Translations between formats can be performed by the demarcation device 204 such that any network 120, 124, 132 can communicate with any phone 244, 248, 252 coupled to the demarcation device 204. For example, the Internet network 132 could be coupled to the POTS telephone 252 using the demarcation device 204. In this embodiment, the demarcation device 204 is accessible from outside the building such that upgrades and repair can be performed without access to the interior of the home or office. In other embodiments, the demarcation device could be inside the building. In some embodiments, the demarcation device 202 could be integrated with a phone or base station.

For the wireless phone(s) 240, the demarcation device 204 may also communicate using a docking cradle coupled to the demarcation device 204, a wireless data channel (e.g., WIFIT™ or BLUETOOTH™), and/or a channel through the wireless network 120. Communication from the wireless phone 240 the demarcation device 204 allows sharing location information such that the demarcation device 204 can determine when the wireless phone is nearby and inform the telephone switch 104 such that routing could be affected.

Figure 2B:
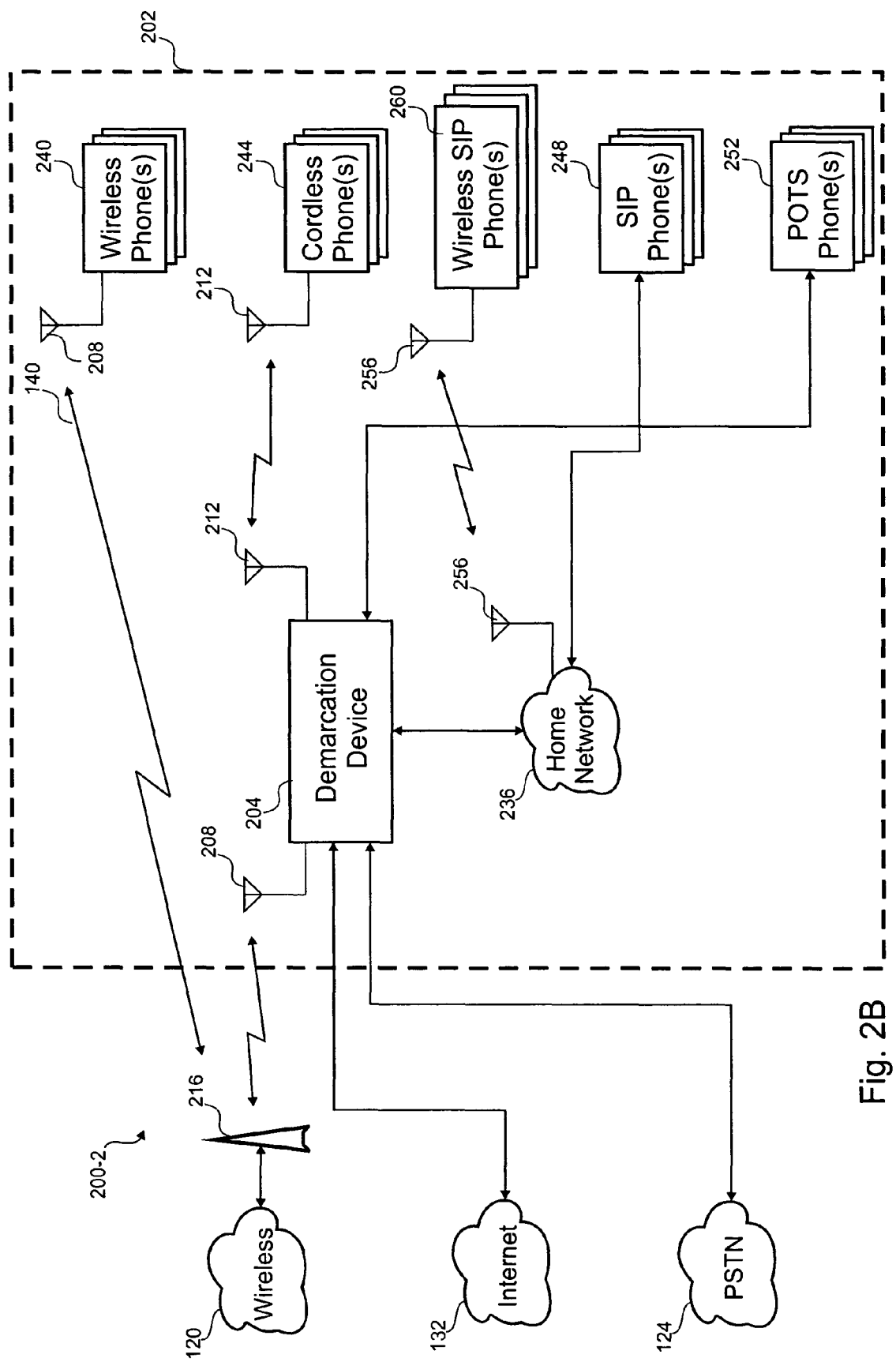
FIG. 2B is a block diagram of another embodiment of the telephone system.

Referring next to FIG. 2B, a block diagram of another embodiment of a telephone system 200-2 is shown. This embodiment adds another type of phone, namely, a wireless SIP phone 260 that communicates with the demarcation device 204 wirelessly using the home network 236. In various embodiments, any wireless data protocol could be used, for example WIFI™ or BLUETOOTH.™ The home network 236 would include a wireless router or access point. In some embodiments, the home network 236 hardware could be integrated into the demarcation device 204.

Figure 2C:
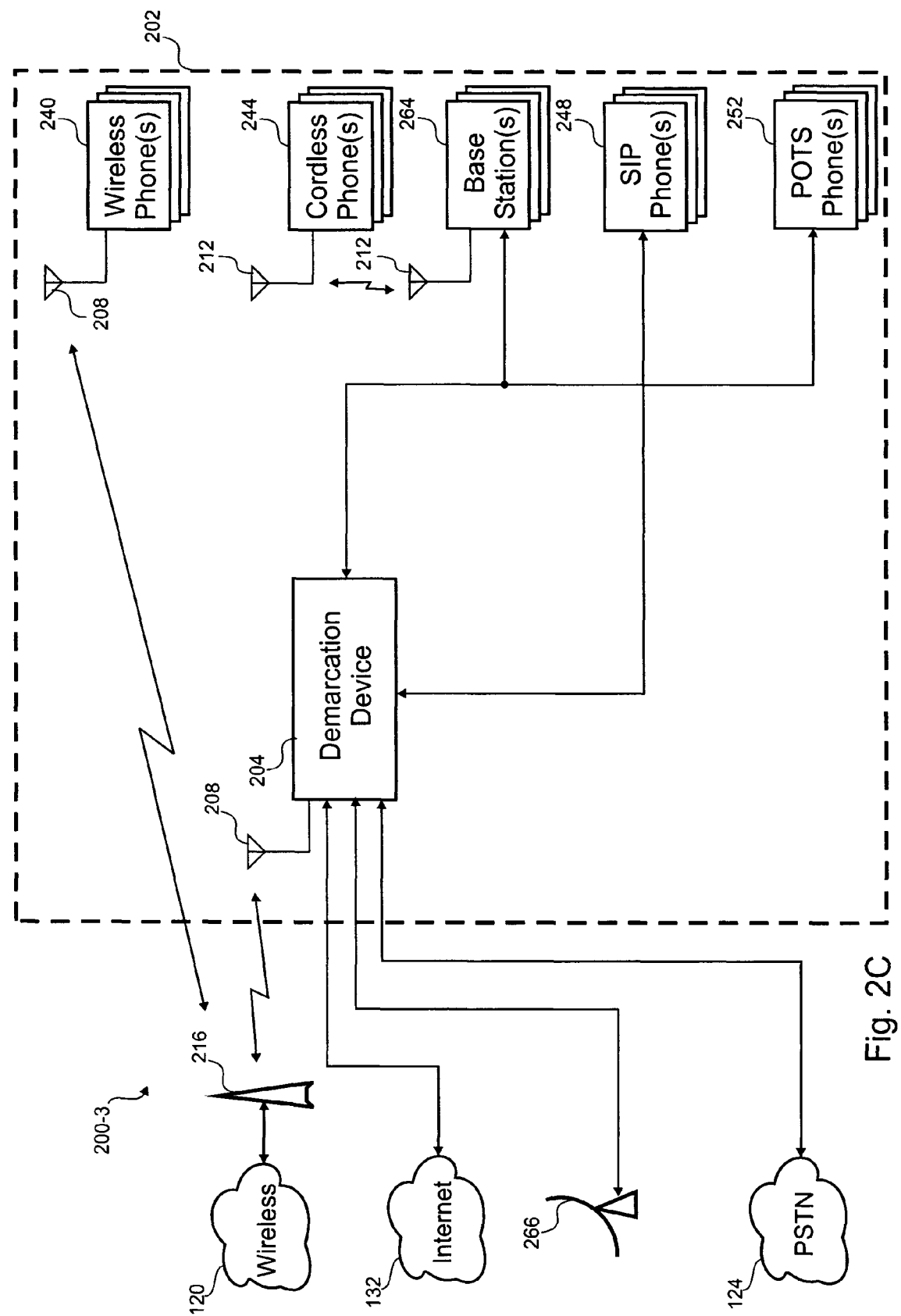
FIG. 2C is a block diagram of yet another embodiment of the telephone system.

With reference to FIG. 2C, a block diagram of yet another embodiment of a voice switching system 200-3 is shown. This embodiment shows a base station(s) 264 broken out separately from the demarcation device 204. The cordless phone(s) 244 communicate with the base station 264 to interface with the demarcation device 204. Some embodiments could use a combination of base stations internal and external to the demarcation device 204. This embodiment integrates the hardware of the home network into the demarcation device 204 such that the SIP phone(s) 248 connect directly with the demarcation device 204. Additionally, this embodiment interfaces the demarcation device with a satellite phone antenna 226 to allow processing calls over a satellite network such as GLOBALSTAR™ and IRIDUM,™ for example.

Figure 3:
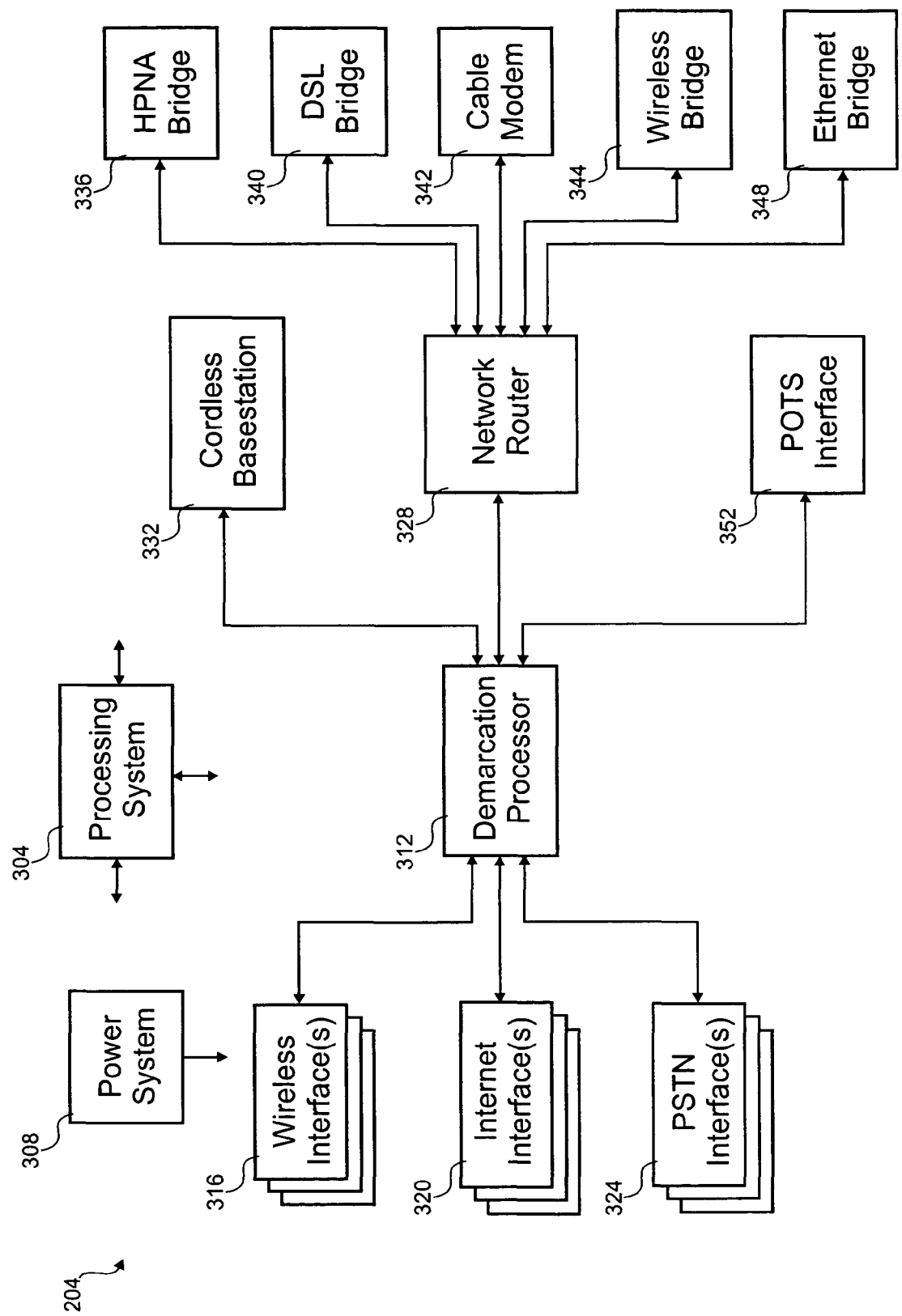
FIG. 3 is a block diagram of an embodiment of a demarcation device.

Referring next to FIG. 3, a block diagram of an embodiment of a demarcation device 204 is shown. A processing system 304 controls operation of the demarcation device and is coupled to other blocks in the demarcation device 204. Also, a power system 308 is used to provide power to blocks in the demarcation device 204. The power system receives its power from either one or more of the networks and/or from within the building.

The demarcation device 204 can be at least partially accessible by the network employees and at least partially accessible the user. In this way, the user can upgrade certain components on the demarcation device 204 without a service call. In some embodiments, the demarcation device 204 could be housed in several enclosures linked together in some way. This embodiment of the demarcation device 204 shows many of the optional interfaces, but a typical implementation will have a subset of these interfaces or would disable those ones that are unused. The user or network employees could add some interfaces and functionality as technology evolves.

The interfaces to the network fall into three general categories, namely, wireless interface(s) 316, Internet interface(s) 320, and PSTN interface(s) 324. These interfaces 316, 320, 324 are coupled to their respective transport networks 120, 124, 132. The interfaces 316, 320, 324 could be used to transport non-voice traffic. For example, home computers could be coupled to a cable modem Internet interface 320. The interfaces 316, 320, 324 convert the received signals into a digital format for the demarcation processor 312. In some cases, the interface 324 passes through an analog signal for the phone call that can be sent to another analog channel, for example, a call received on the PSTN interface 324 could be coupled directly to a POTS interface 352 with little or no modification.

The demarcation processor 312 processes the phone calls by cross routing them to different types of phone transports supported within the building. The phone transports are optional and upgradeable in this embodiment. The voice calls for this embodiment are sent using one or more of a cordless basestation 332, the POTS interface 352, and/or a packet switched bridge. There are various types of bridges supported, for example, a HPNA bridge 336, a DSL bridge 340, a cable modem bridge 342, a wireless bridge 344, an ethernet bridge 348, and an ethernet bridge 348. The various bridges 336, 340, 342, 344, 348 are logically coupled together with a network router 328 such that a SIP phone 248 on the DSL bridge 340 could work with another SIP phone 248 on the HPNA bridge 336, for example.

The demarcation processor 312 can determine caller ID information, ringing condition and disconnect condition for the various interfaces 316, 320, 324 and pass that along to the phones or not. The demarcation processor 312 analyzes phone calls to determine if they should be passed along to the phones. In some cases, phone calls are passed to a remote voice response system 106. In some embodiments, the voice response system 106 could be internal to the demarcation device 204. The voice response system could ask for further information from the caller or take a voice mail message from the caller.

Figure 4A:
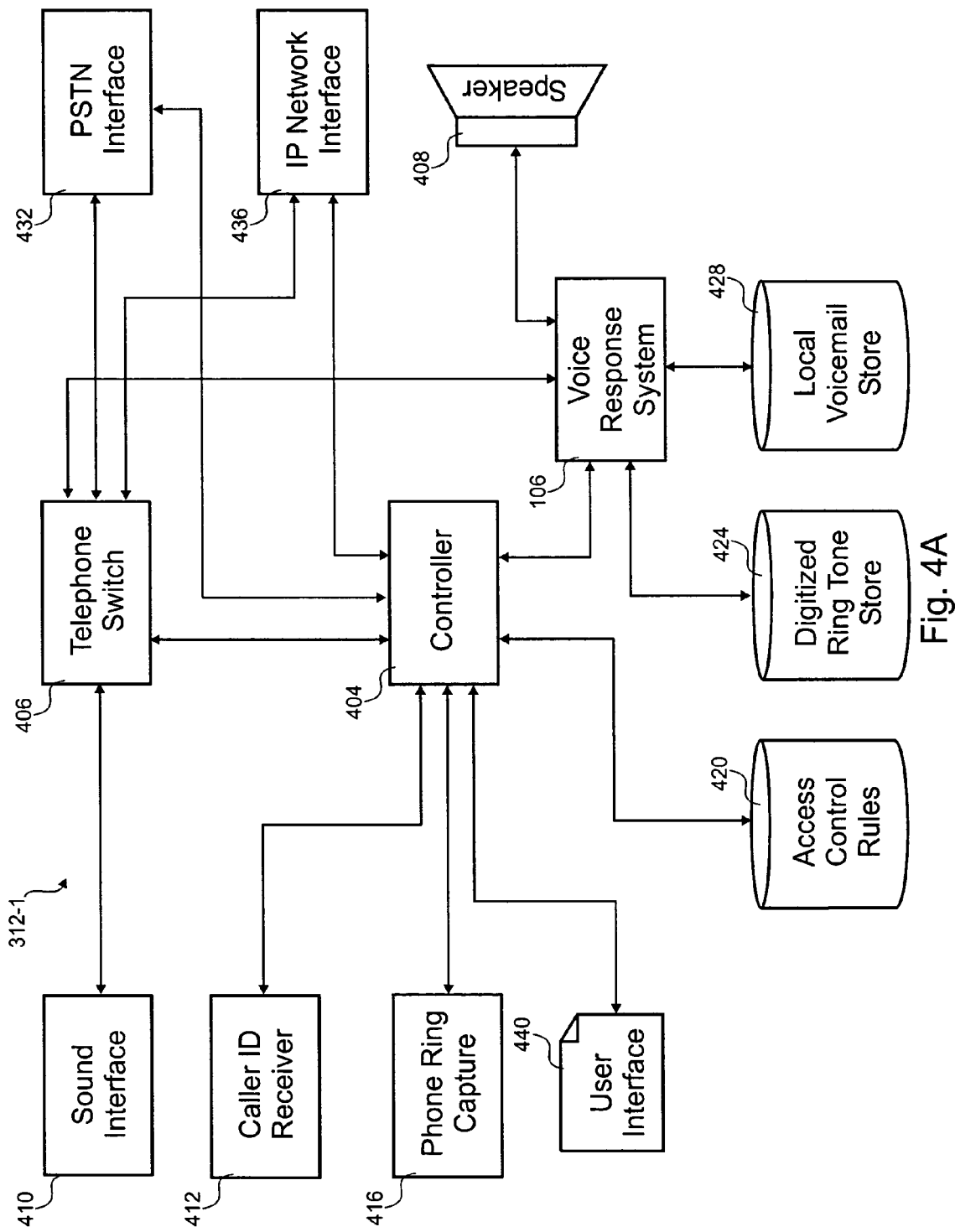
FIG. 4A is a block diagram of an embodiment of a demarcation processor.

With reference to FIG. 4A, a block diagram of an embodiment of a demarcation processor 312-1 is shown. Generally, the demarcation processor 312-1 can pass along a phone call or forward it to a voice response system 106. Caller ID information is captured after detecting the incoming phone call. A user interface 440 allows entry and/or modification of access control rules 420. Included in the demarcation processor 312-2 are a controller 404, a telephone switch 406, a speaker 408, a sound interface 410, a caller ID receiver 412, a phone ring capture circuit 416, the voice response system 106, access control rules 420, digitized ring tone store 424, a local voicemail store 428, a PSTN interface 432, an IP network interface 436, and a user interface 440.

There are at least three components of an incoming call provided by the interface 316, 320, 324 receiving the phone call. When a call is first received, a signal is sent to the phone ring capture circuit 416. For PSTN calls, this would correspond to the ring voltage, but other interfaces 316, 320 have analogous indicators that are processed to send the appropriate signal to the phone ring capture circuit 416. At some point, information is received by the caller ID receiver 412 to indicate the calling party's name and/or phone number, if available. When only the phone number is available, the controller 404 could see if a name is stored or query a remote database for a name. The sound interface 410 is used to communicate the phone conversation once the call is answered by a phone or the voice response system 106.

The controller 404 uses a telephone switch 406 to route the phone call to at least one of the PSTN interface 432, the IP network interface 436 and/or the voice response system 106. In some cases, the phone call is routed to two or more of these. For example, both the PSTN interface 432 and the IP network interface 436 may be sent the same phone call and phones using both interfaces could simultaneously participate in a phone call. If a call is forwarded to the voice response system 106, the call could also be sent to the phone interfaces 432, 436 such that they can listen to the interaction with the voice response system 106. The speaker 408 could also echo the conversation with the voice response system 106.

Calls are optionally screened by the controller 404. Access control rules 420 are applied when a call is received and/or when the caller ID information is received. The controller 404 may block the call altogether; route the call to one interface 432, 436 and not another 436, 432; route the call directly to the voice response system 106; etc.

A user interface 440 is used to enter the various access control rules 420 and otherwise program the demarcation processor 312-1. The user interface 440 could be a standard web interface, a custom application interface and/or a voice recognition based system. In addition to configuration, the user interface 440 could be used to playback messages, interact with call logs, usage information, and billing information. In some embodiments, the user interface 440 is only accessible from within the user location intranet, but in other embodiments, the user interface 440 is also accessible by a user away from the user location by way of the Internet or public phone system.

The voice response system 106 may play messages and capture voice signals and keypad tones. The voice signals could be digitized for voicemail or ring tones or could be used with voice recognition to control the voice response system 106. For some incoming calls, the voice response system 106 asks the caller to record a message such as the caller's name. That message is added to the ring tone store 424. The voice response system 106 can playback that ring tone on the speaker 408 and/or with the phones to announce the caller if so indicated by an access control rule 420.

For example, all calls could be blocked during the afternoons such that the phones would not normally ring. A caller is routed to the voice response system 106 and informed that calls are blocked, but an option is given to the caller for recording a message for playing that may result in the call being answered. The phones and/or speaker 408 would play the message such that the user's could pick up the line to talk to the caller. In some embodiments, the stored message could be played next time in lieu of a generic ring tone once the caller ID identifies the caller.

Figure 4B:
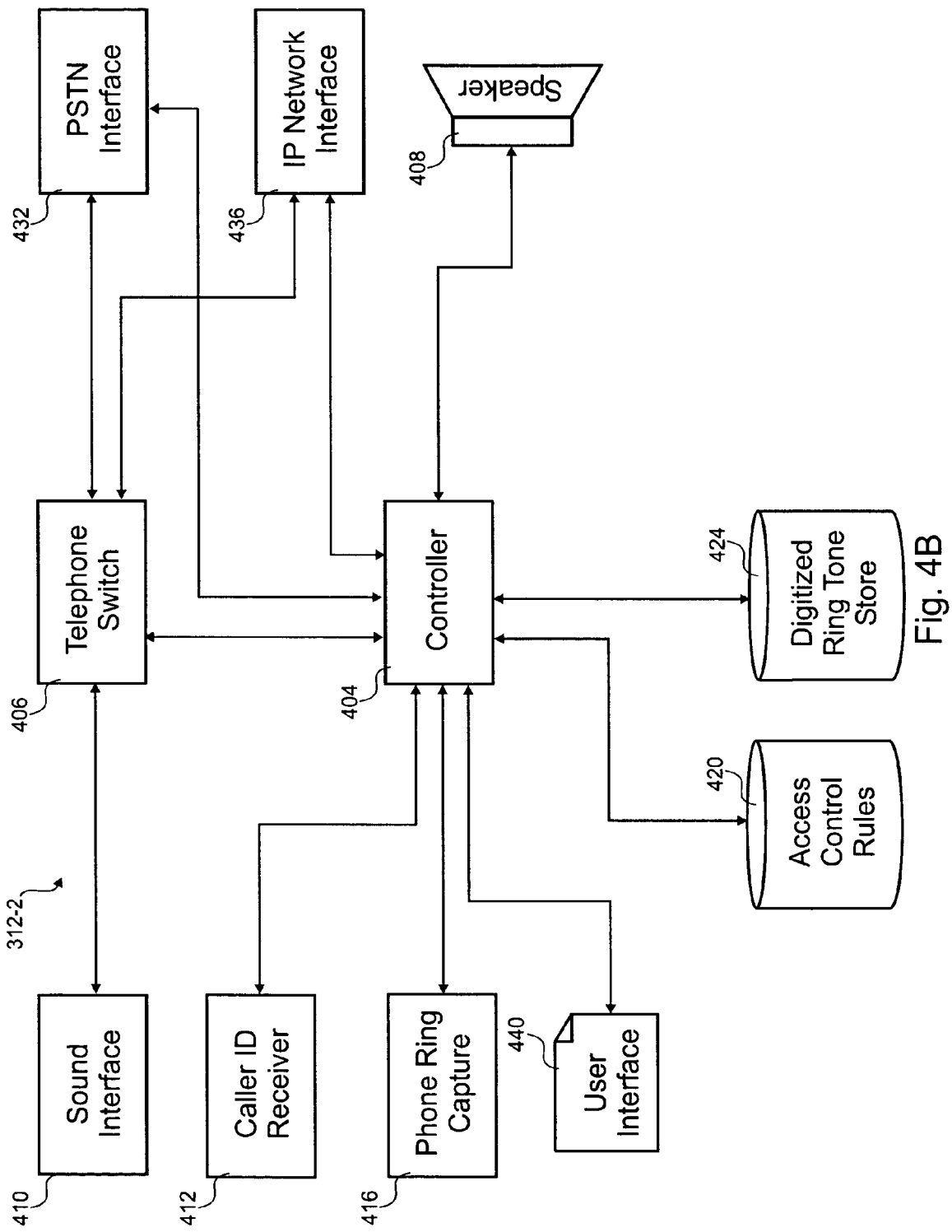
FIG. 4B is a block diagram of another embodiment of a demarcation processor is shown that uses a voice response system remote to the user location.

With reference to FIG. 4B, a block diagram of another embodiment of a demarcation processor 312-2 is shown that uses a voice response system 106 remote to the user location. In this embodiment, some phone calls are forwarded back to the voice switching system 100 when the access control rules 420 dictate. Messages and voice prompts are used by the remote voice response system 106 to gather information from the blocked caller. The voice response system 106 could call back to the demarcation processor to provide a customized ring tone in an attempt to connect the caller again.

Figure 5:
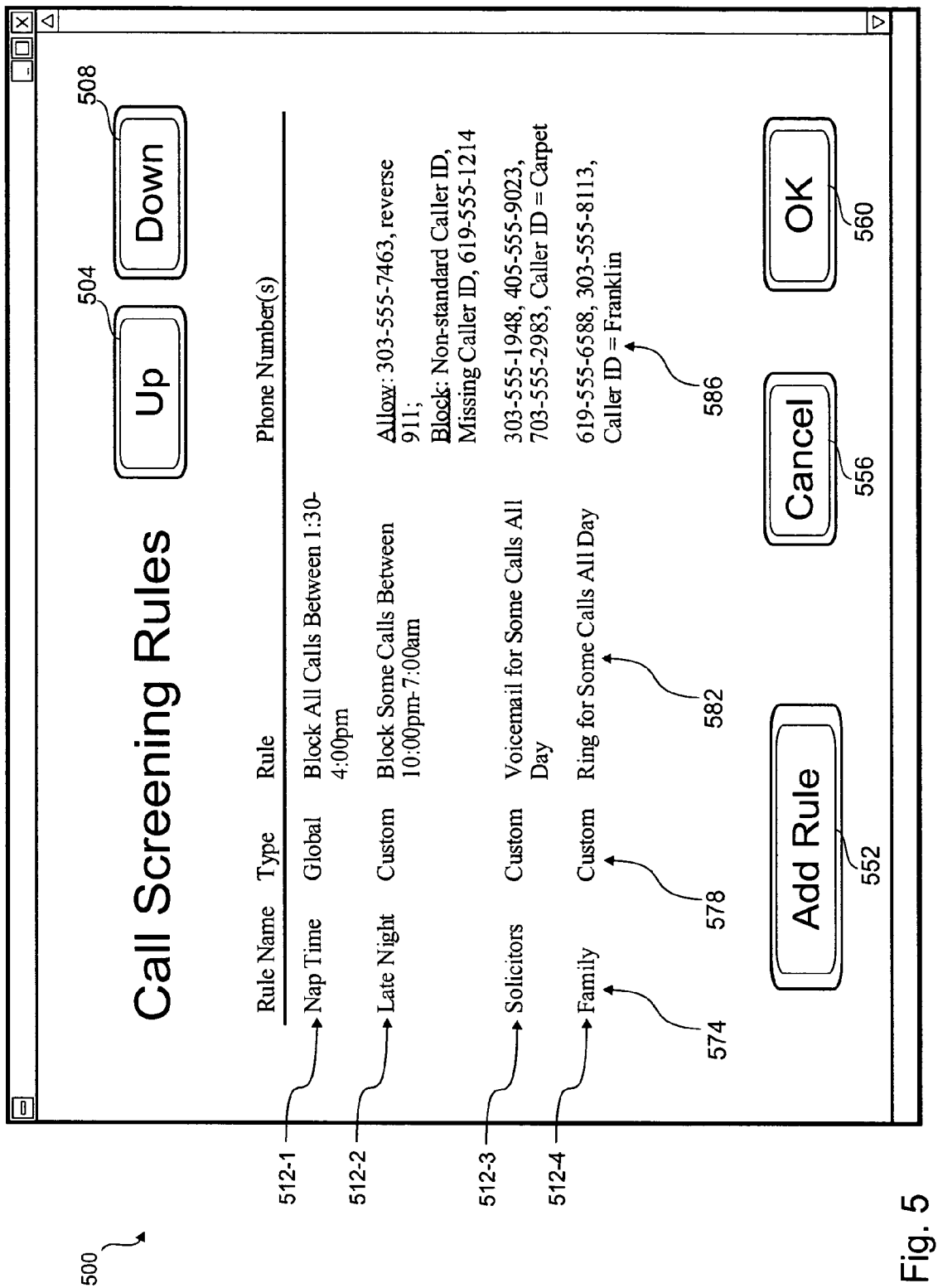
FIG. 5 is a screen shot of an embodiment of an interface for entry of access control rules.

Referring next to FIG. 5, a screen shot of an embodiment of an access control entry screen 500 is shown. This access control screen 500 is part of the user interface 440 and could be accessed via a web browser or an application interface. Any number of access control rules 512 are entered in the order of execution. That ordering of the rules 512 is adjustable by selecting the rule 512 and clicking up or down soft buttons 504, 508. New rules 512 can be added by clicking the add rule button 552. The cancel button 556 allows exiting the screen 500 without saving changes. Alternatively, the OK button 560 allows exiting the screen and saving any changes.

Each rule 512 is described with four columns. The first column 574 is entitled "Rule Name" and allows the user to give a title for the rule 512. In the second column 578, the type of rule is identified as either a global rule or a custom rule. The global rules are executed without consideration of the caller ID information, and the custom rules do consider the caller ID information. The rule is specified in the third column 582, but is entered using a pop-up screen or other method to choose the various options. For custom type rules, the relevant phone numbers and/or caller ID strings are specified in the fourth column 586. An example of a custom rule would be a rule that looked for caller ID information relating to a reverse-911 phone call that would route through the phone call without regard to any other screening rules. The reverse-911 call could have a special ring tone or message to further accentuate the urgency.

This embodiment of the access control screen 500 has four example rules 512. Other embodiments could have any number of rules 512. The first rule 512-1 globally blocks all calls between 1:30 p.m. and 4:00 p.m. regardless of the caller ID information. In the second rule 512-2, some calls are blocked such as a specific number and calls with non-standard, missing or blocked caller ID information. The second rule 512-2 also excludes some numbers from application of the rule 512-2, for example, reverse 911 calls are never screened. Specific numbers and a particular caller ID string having the word "carpet" are screened in the third rule 512-3. In the fourth rule 512-4, certain numbers and words in the caller ID information will be passed by the demarcation processor 312 regardless of other rules.

Figure 6A:
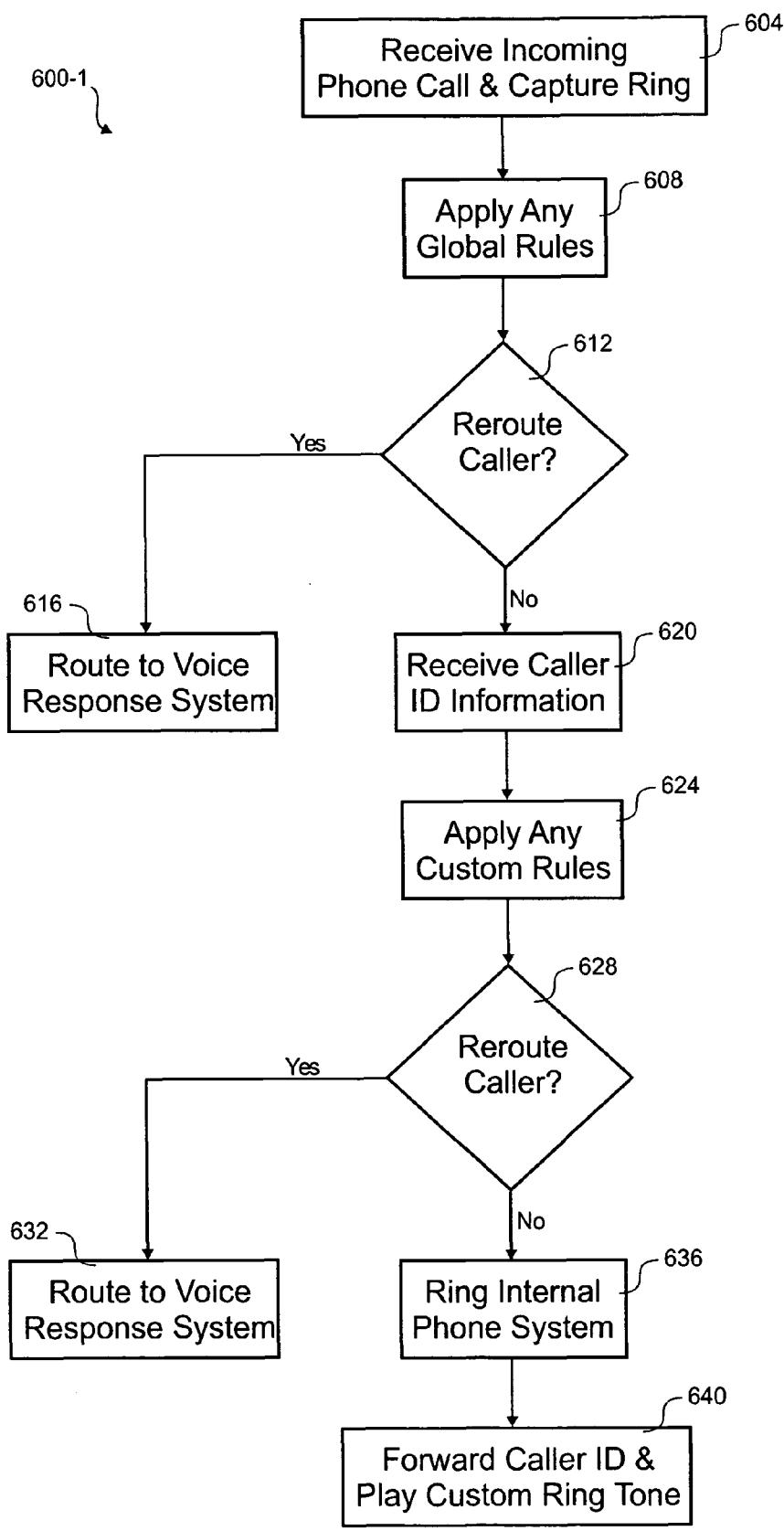
FIG. 6A is a flow diagram of an embodiment of a process for receiving incoming phone calls.

With reference to FIG. 6A, a flow diagram of an embodiment of a process 600-1 for receiving incoming phone calls is shown. In this embodiment, access control rules 420 are applied in a two-stage process where the global rules are applied first and the custom rules are applied second. The depicted portion of the process begins in step 604 where an incoming call is received and the ring condition is captured. Any global rules are applied in step 608. Global rules are those that do not depend on caller ID information. In step 612, the rule 512 may result in routing the call to the voice response system 106 in step 616. Further, the voice response system 106 may take a message or query for more information based upon the rule 512. In some embodiments, a phone call may immediately be passed to the phones within the user location, but cut off if a rule 512 later decides the call should not be passed through.

Where the call is not diverted to the voice response system 106 in step 612, processing continues to step 620 where caller ID information is received. Commonly, caller ID information is received after the phone call rings. Any custom rules are applied upon the caller ID information in step 624. The custom rules take into account the caller ID information and could make decisions based upon numbers or name information in the caller ID information. A decision to reroute the caller is performed in step 628 which could involve routing the caller to the voice response system 106 for handling in step 632. In some cases, the voice response system 106 could ring the phone call back through with or without a custom ring tone. Where no custom rule 512 reroutes the phone call, the PSTN and/or IP network interfaces 432, 436 are activated to ring the phone(s) internal to the user location. Any caller ID and/or custom ring tones are forwarded to the phone(s) when the call is passed through.

Figure 6B:
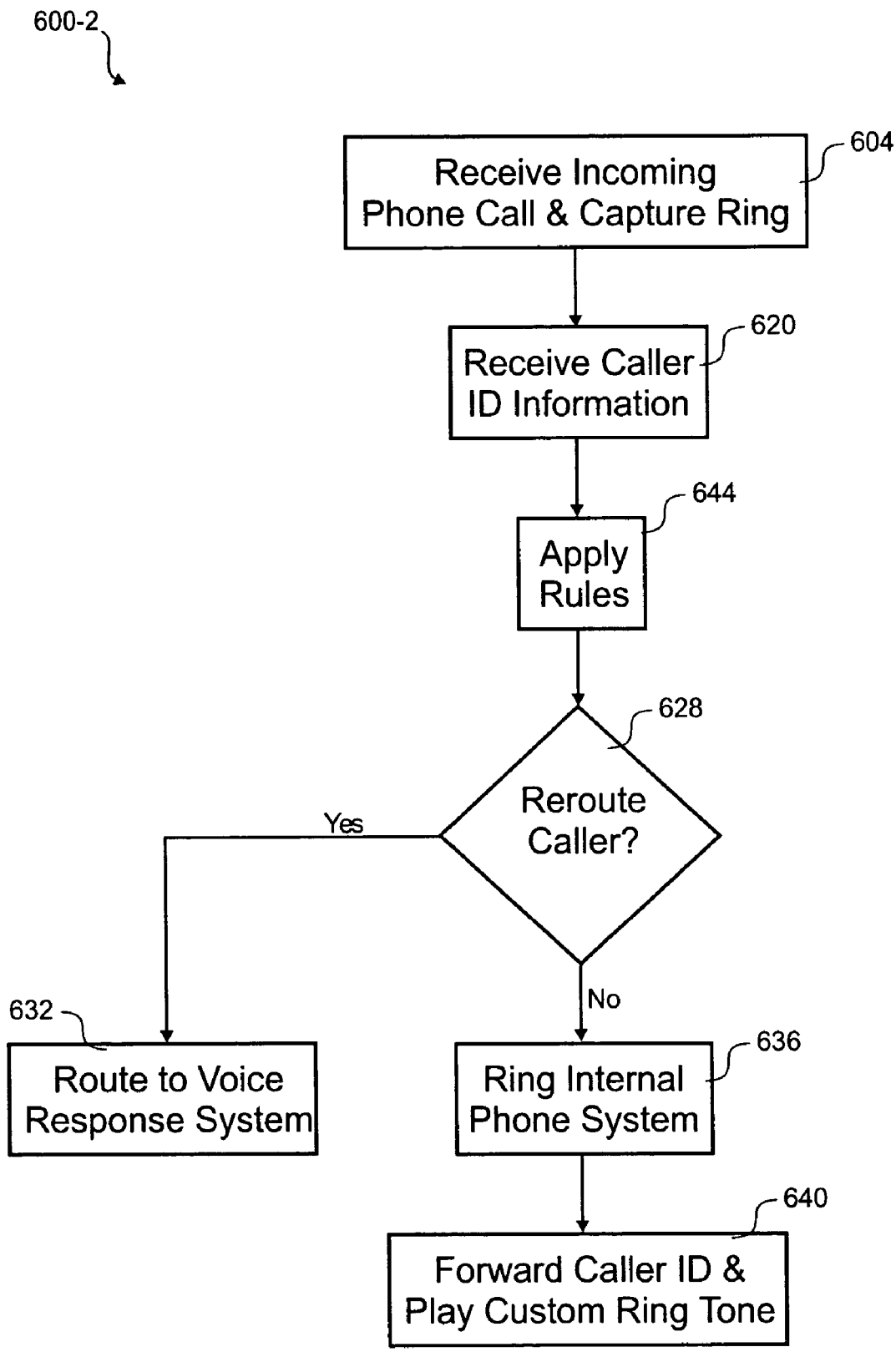
FIG. 6B is a flow diagram of another embodiment of a process for receiving incoming phone calls that makes switching decisions after receiving the caller ID information.

Referring next to FIG. 6B, a flow diagram of another embodiment of a process 600-2 for receiving incoming phone calls is shown that makes switching decisions after receiving the caller ID information. In this embodiment, the ring signal and caller ID information are captured before applying all rules 512 in step 644. Calls are directed to the voice response system 106 or passed through according to the rules. Where no caller ID information is received, the custom rules 512 are not applied. A global rule 512 could be defined that doesn't allow passing through the phone call where no caller ID information is received, which would prevent the phones from ringing until caller ID information is received.

While the principles of the invention have been described above in connection with specific apparatuses and methods, it is to be clearly understood that this description is made only by way of example and not as limitation on the scope of the invention.

What is claimed is:

1. A network interface device for processing a telephone call, the network interface device comprising:
   a first communication interface coupled to at least one of a wireless phone network, a public switched telephone network (PSTN), a satellite phone network, and a voice over Internet protocol (VOIP) network, wherein the first communication interface receives the telephone call from any of a plurality of callers remote to the network interface device;
   a second communication interface coupled to one or more phones at a user location, wherein:
      the one or more phones are associated with a telephone number, and
      the plurality of callers can call the one or more phones with the telephone number;
   a telephone switch coupled to both of the first communication interface and second communication interface, wherein the telephone switch optionally routes an incoming phone call to the second communication interface if one or more access control rules permit routing the incoming phone call to the second communication interface; and
   a controller that analyzes the one or more access control rules which comprise either 1) routing the incoming phone call from the first communication interface to the second communication interface, 2) routing the incoming phone call to a voice response system, or 3) preventing the incoming phone call from reaching the second communication interface, wherein the one or more phones ring when the incoming call is routed to the second communication interface,
   wherein the controller routes the incoming phone call to a voice response system which queries a caller of the incoming phone call to record a greeting, and on a subsequent phone call from the caller routed to the second communication interface, a ring tone for the subsequent call comprises the greeting; and
   wherein the second communication interface comprises both a PSTN interface and an IP network interface, and at least one phone coupled to the PSTN interface and at least one phone coupled to the IP network interface simultaneously participate in the subsequent call.

2. The network interface device for processing the telephone call as recited in claim 1, wherein the greeting is played instead of a ring tone.

3. The network interface device for processing the telephone call as recited in claim 1, wherein the network interface device is located at the user location.

4. The network interface device for processing the telephone call as recited in claim 1, wherein the network interface device is physically accessible from outside the user location.

5. The network interface device for processing the telephone call as recited in claim 1, wherein the one or more access control rules are stored within the network interface device.

6. The network interface device for processing the telephone call as recited in claim 1, wherein the second communication interface is one of a PSTN interface and a VOIP interface.

7. The network interface device for processing the telephone call as recited in claim 6, wherein the VOIP interface is one of a wireless Internet interface, a WIFI™ interface, a power line Internet interface, an ultra-wide band wireless interface, a cable modem interface, an ethernet interface, and a DSL Internet interface.

8. The network interface device for processing the telephone call as recited in claim 1, wherein the first communication interface uses a first physical transport that is different from a second physical transport of the second communication interface.

9. The network interface device for processing the telephone call as recited in claim 1, wherein the one or more phones are chosen from the group consisting of a POTS phone, a cordless phone, a WIFI™ SIP phone, and a Wired SIP phone.

10. The network interface device for processing the telephone call as recited in claim 1, wherein the network interface device is integral with at least one of the one or more phones.

11. The network interface device for processing the telephone call as recited in claim 1, wherein the controller routes the incoming phone call to voicemail according to the one or more access control rules.

12. The network interface device for processing the telephone call as recited in claim 1, wherein the one or more access control rules may be modified via a user interface accessible by way of the Internet.

13. The network interface device for processing the telephone call as recited in claim 1, wherein the first communication interface is coupled to at least two of a wireless phone network, a public switched telephone network (PSTN), a satellite phone network, and a voice over Internet protocol (VOIP) network.

14. A method for processing a telephone call, the method comprising steps of:
   receiving a phone call from a first communication interface coupled to at least two of a wireless phone network, a wired phone network, a satellite phone network, and a voice over Internet protocol (VOIP) network, wherein the first communication interface receives the telephone call from any of a plurality of callers remote to the network interface device;
   providing a second communication interface coupled to one or more phones at a user location, wherein:
      the one or more phones are associated with a telephone number, and
      the plurality of callers can call the one or more phones with the telephone number;
   analyzing the one or more access control rules; and
   performing one of a following steps depending on the analyzing step:
      routing the incoming phone call from the first communication interface to the second communication interface, and
      preventing the incoming phone call from reaching the second communication interface, wherein the one or more phones ring when the incoming call is routed to the second communication interface,
   wherein the second communication interface comprises both a PSTN interface and an IP network interface, and at least one phone coupled to the PSTN interface and at least one phone coupled to the IP network interface simultaneously participate in the phone call.

15. The method for processing the telephone call as recited in claim 14, wherein the one or more access control rules test a caller ID variable associated with the incoming call.

16. The method for processing the telephone call as recited in claim 14, wherein the one or more access control rules block all incoming calls during a time period.

17. The method for processing the telephone call as recited in claim 14, wherein the one or more access control rules route all incoming calls during a time period to a voice response system.

18. The method for processing the telephone call as recited in claim 14, wherein the one or more access control rules block one or more incoming calls during a time period.

19. The method for processing the telephone call as recited in claim 14, wherein a specified number overrides the one or more access control rules to route the incoming phone call to the second communication interface.

20. A method for processing a telephone call, the method comprising steps of:

modifying one or more access control rules based on input from a user received via a user interface accessible by way of the Internet;

receiving a phone call from a first communication interface coupled to at least one of a wireless phone network, a wired phone network, a satellite phone network, and a voice over Internet protocol (VOIP) network, wherein the communication interface receives the telephone call from any of a plurality of callers remote to the network interface device;

providing a second communication interface coupled to one or more phones at a user location, wherein:

the one or more phones are associated with a telephone number, and the plurality of callers can call the one or more phones with the telephone number;

analyzing the one or more access control rules; and performing one of a following steps depending on the analyzing step:

routing the incoming phone call from the first communication interface to the second communication interface, preventing the incoming phone call from reaching the second communication interface, wherein the one or more phones ring when the incoming call is routed to the second communication interface, and routing the incoming phone call to a voice response system, wherein the second communication interface comprises both a PSTN interface and an IP network interface, and at least one phone coupled to the PSTN interface and at least one phone coupled to the IP network interface simultaneously participate in the phone call.

21. The method for processing the telephone call as recited in claim 20, wherein the user location is a residence and the method is performed within the user location, but not on the one or more phones.

* * * * *